(12) United States Patent
Guo et al.

(10) Patent No.: US 12,444,134 B2
(45) Date of Patent: Oct. 14, 2025

(54) DYNAMIC VISUALIZATION METHOD AND DEVICE FOR EARTHQUAKE DISASTERS

(71) Applicant: Southeast University, Jiangsu (CN)

(72) Inventors: Tong Guo, Jiangsu (CN); Shuqi Yu, Jiangsu (CN); Minte Zhang, Jiangsu (CN)

(73) Assignee: Southeast University, Jiangsu (CN)

( * ) Notice: Subject to any disclaimer, the term of this patent is extended or adjusted under 35 U.S.C. 154(b) by 0 days.

(21) Appl. No.: 18/716,939

(22) PCT Filed: Jul. 11, 2023

(86) PCT No.: PCT/CN2023/106707
§ 371 (c)(1),
(2) Date: Jun. 6, 2024

(87) PCT Pub. No.: WO2024/098822
PCT Pub. Date: May 16, 2024

(65) Prior Publication Data
US 2025/0037370 A1     Jan. 30, 2025

(30) Foreign Application Priority Data

Nov. 11, 2022  (CN) .......................... 202211413736.2

(51) Int. Cl.
*G06T 17/05* (2011.01)
*G06T 7/11* (2017.01)
(Continued)

(52) U.S. Cl.
CPC ................ *G06T 17/05* (2013.01); *G06T 7/11* (2017.01); *G06T 7/73* (2017.01); *G06T 19/20* (2013.01);
(Continued)

(58) Field of Classification Search
None
See application file for complete search history.

(56) References Cited

U.S. PATENT DOCUMENTS

2015/0273323 A1* 10/2015 Perry .................... A63F 13/428
463/7
2023/0141319 A1* 5/2023 Knuffman .............. G06N 3/045
345/419

FOREIGN PATENT DOCUMENTS

CN     105844629     8/2016
CN     109544683     3/2019
(Continued)

OTHER PUBLICATIONS

"International Search Report (Form PCT/ISA/210) of PCT/CN2023/106707", mailed on Oct. 18, 2023, with English translation thereof, pp. 1-6.
(Continued)

*Primary Examiner* — Frank S Chen
(74) *Attorney, Agent, or Firm* — JCIPRNET (57) ABSTRACT

The application relates to a dynamic visualization method and device for earthquake disasters. The method comprises: acquiring initial point cloud data of buildings and scenes in a target area; acquiring shake displacement data varying with time of the buildings by simulating an earthquake excitation on the buildings and the scenes; performing voxel downsampling and point cloud segmentation and extraction on the initial point cloud data to determine a ground point cloud and a point cloud of each building; updating in real time coordinates of each point of the point cloud of each building according to the shake displacement data; and rendering in real time the ground point cloud and the coordinates of each point of the point cloud of each building to generate a dynamic visual image for displaying.

11 Claims, 5 Drawing Sheets

(51) Int. Cl.
*G06T 7/73* (2017.01)
*G06T 19/20* (2011.01)

(52) U.S. Cl.
CPC .............. *G06T 2207/10028* (2013.01); *G06T 2207/30184* (2013.01); *G06T 2210/56* (2013.01); *G06T 2219/2012* (2013.01); *G06T 2219/2016* (2013.01)

(56) References Cited

FOREIGN PATENT DOCUMENTS

| | | |
|---|---|---|
| CN | 109635441 | 4/2019 |
| CN | 109685891 | 4/2019 |
| CN | 109766652 | 5/2019 |
| CN | 116012542 | 4/2023 |
| WO | 2011132205 | 10/2011 |

OTHER PUBLICATIONS

"Written Opinion of the International Searching Authority (Form PCT/ISA/237) of PCT/CN2023/106707", mailed on Oct. 18, 2023, pp. 1-4.

\* cited by examiner

140
DYNAMIC VISUALIZATION METHOD AND DEVICE FOR EARTHQUAKE DISASTERS

CROSS-REFERENCE TO RELATED APPLICATION

This application is a 371 of international application of PCT application serial no. PCT/CN2023/106707, filed on Jul. 11, 2023, which claims the priority benefit of China application no. 202211413736.2, filed on Nov. 11, 2022. The entirety of each of the above-mentioned patent applications is hereby incorporated by reference herein and made a part of this specification.

TECHNICAL FIELD

The application relates to the technical field of computers, and particularly relates to a dynamic visualization method and device for earthquake disasters.

DESCRIPTION OF RELATED ART

Earthquakes are among the worst and deadliest of natural disasters. With the acceleration of urbanization and the increase of the urban population density, a catastrophic consequence will emerge once a violent earthquake occurs in an urban region. According to related statistics, the occurrence frequency of earthquakes is on the rise, and casualties and economic losses caused by earthquakes are also on the rise.

The rapid development of the computer level and continuous improvement of earthquake disaster simulation requirements lead to the gradual emergence of spatial information platforms based on simulation of different earthquake disasters. In related arts, by means of acquisition methods represented by oblique photography and laser scanning, direct and effective means are provided for visualization of real scenes of earthquake disasters, and point cloud data with spatial attributes and coordinates can be obtained to present scenes of buildings in an area in an earthquake, but the visualization effect is unsatisfactory.

BRIEF SUMMARY OF THE INVENTION

In view of the above technical problems, it is necessary to provide a dynamic visualization method and device for earthquake disasters to improve the visualization effect.

A dynamic visualization method for earthquake disasters comprises:
acquiring initial point cloud data of buildings and scenes in a target area;
acquiring shake displacement data varying with time of the buildings, wherein the shake displacement data is obtained by simulating an earthquake excitation on the buildings and the scenes;
performing voxel downsampling and point cloud segmentation and extraction on the initial point cloud data to determine a ground point cloud and a point cloud corresponding to each building;
updating in real time coordinates of each point of the point cloud corresponding to each building at the present time according to the shake displacement data varying with time of the buildings; and
rendering in real time the ground point cloud and the coordinates of each point of the point cloud corresponding to each building at the present time to generate a dynamic visual image for displaying.

In one embodiment, acquiring initial point cloud data of buildings and scenes in a target area comprises:
performing data acquisition on the buildings and scenes in the target area by means of an unmanned aerial vehicle, a laser scanner and a depth camera respectively to obtain corresponding data of the unmanned aerial vehicle, the laser scanner and the depth camera; and
fusing the corresponding data of the unmanned aerial vehicle, the laser scanner and the depth camera to generate the initial point cloud data of the buildings and scenes in the target area.

In one embodiment, performing voxel downsampling and point cloud segmentation and extraction on the initial point cloud data to determine a ground point cloud and a point cloud corresponding to each building comprises:
performing voxel downsampling on the initial point cloud data to obtain downsampled point cloud data;
extracting points belonging to the ground from the downsampled point cloud data by a plane fitting technique to determine the ground point cloud; and
segmenting points, not belonging to the ground, in the downsampled point cloud data by clustering to determine the point cloud corresponding to each building.

In one embodiment, updating in real time coordinates of each point of the point cloud corresponding to each building at the present time according to the shake displacement data varying with time of the buildings comprises:
performing fitting according to the shake displacement data varying with time of the buildings to generate a fitting function varying with time;
binding each point in the fitting function with each point of the point cloud corresponding to each building; and
updating in real time the coordinates of each point of the point cloud corresponding to each building according to the fitting function at the present time.

In one embodiment, updating in real time the coordinates of each point of the point cloud corresponding to each building according to the fitting function at the present time comprises:
updating the coordinates of each point of the point cloud corresponding to each building according to the fitting function at the present time and a preset shake coefficient.

In one embodiment, rendering in real time the ground point cloud and the coordinates of each point of the point cloud corresponding to each building at the present time to generate a dynamic visual image for displaying comprise:
rendering in real time the ground point cloud and the coordinates of each point of the point cloud corresponding to each building at the present time according to preset rendering parameters to generate a dynamic building visual image for displaying;
and/or, coloring each point of the point cloud corresponding to each building at the present time according to a displacement change of each point of the point cloud corresponding to each building at the present time to generate a colored point cloud corresponding to each building at the present time; and
rendering the ground point cloud and the colored point cloud corresponding to each building at the present time according to the preset rendering parameters to generate a dynamic building point cloud visual image for displaying.

A dynamic visualization method for earthquake disasters comprises:

a point cloud data acquisition module configured to acquire initial point cloud data of buildings and scenes in a target area;

a shake displacement data acquisition module configured to acquire shake displacement data varying with time of the buildings, wherein the shake displacement data is obtained by simulating an earthquake excitation on the buildings and the scenes;

a point cloud data processing module configured to perform voxel downsampling and point cloud segmentation and extraction on the initial point cloud data to determine a ground point cloud and a point cloud corresponding to each building;

a point cloud data updating module configured to update in real time coordinates of each point of the point cloud corresponding to each building at the present time according to the shake displacement data varying with time of the buildings; and a display module configured to render in real time the ground point cloud and the coordinates of each point of the point cloud corresponding to each building at the present time to generate a dynamic visual image for displaying.

According to the dynamic visualization method and device for earthquake disasters, initial point cloud data of buildings and scenes in a target area is acquired; shake displacement data varying with time of the buildings is acquired, wherein the shake displacement data is obtained by simulating an earthquake excitation on the buildings and the scenes; then, voxel downsampling and point cloud segmentation and extraction are performed on the initial point cloud data to determine a ground point cloud and a point cloud corresponding to each building; coordinates of each point of the point cloud corresponding to each building at the present time are updated in real time according to the shake displacement data varying with time of the buildings; and the ground point cloud and the coordinates of each point of the point cloud corresponding to each building at the present time are rendered in real time to generate a dynamic visual image for displaying. In this way, by rendering the ground point cloud and the coordinates of each point of the point cloud corresponding to each building at the present time to generate a dynamic visual image for displaying, seismic scenes of regional buildings can be presented more truly and visually, thus improving the visualization effect.

DETAILED DESCRIPTION OF THE INVENTION

To gain a better understanding of the purposes, technical solutions and advantages of the application, the application will be described in further detail below in conjunction with accompanying drawings and embodiments. It should be understood that the specific embodiments described here are merely used for explaining the application and are not intended to limit the application.

Figure 1:
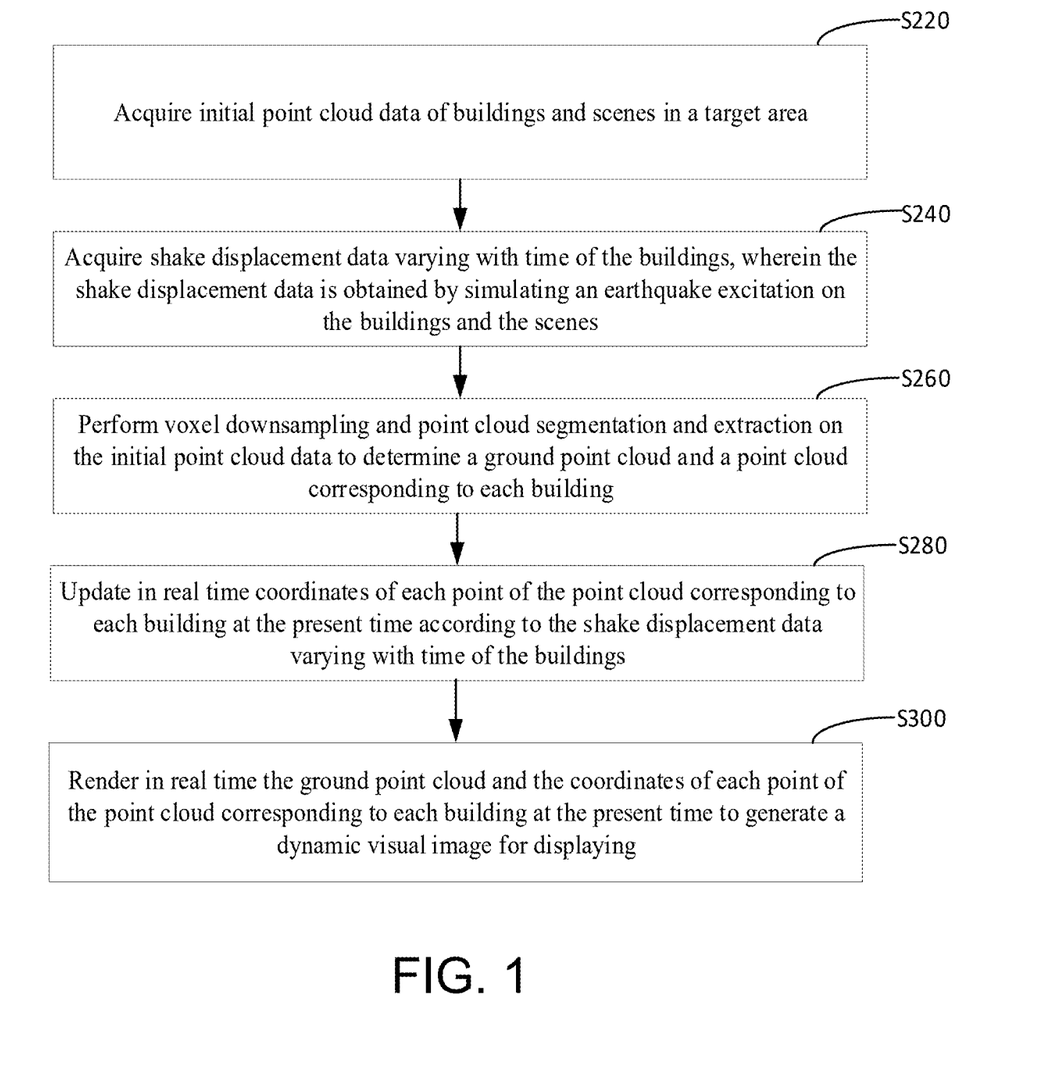
FIG. 1 is a schematic flow diagram of a dynamic visualization method for earthquake disasters according to one embodiment.

In one embodiment, as shown in FIG. 1, a dynamic visualization method for earthquake disasters is provided. The dynamic visualization method for earthquake disasters, for example, when applied to a terminal, comprises the following steps:

S220, acquiring initial point cloud data of buildings and scenes in a target area.

Wherein, the initial point cloud data may be point cloud data, which is obtained by photographing or scanning and processing the buildings and scenes in the target area through one or more acquisition methods and represents three-dimensional information.

It should be understood that by using point cloud data for dynamic visualization of earthquake disasters, the space occupied by data is small, thus reducing the data storage space; segmentation and extraction can be performed directly according to point cloud coordinates, so the computation time is shortened, and the operating rate can be optimized and adjusted according to precision requirements.

S240, acquiring shake displacement data varying with time of the buildings, wherein the shake displacement data is obtained by simulating an earthquake excitation on the buildings and the scenes.

S260, performing voxel downsampling and point cloud segmentation and extraction on the initial point cloud data to determine a ground point cloud and a point cloud corresponding to each building.

Figure 2:
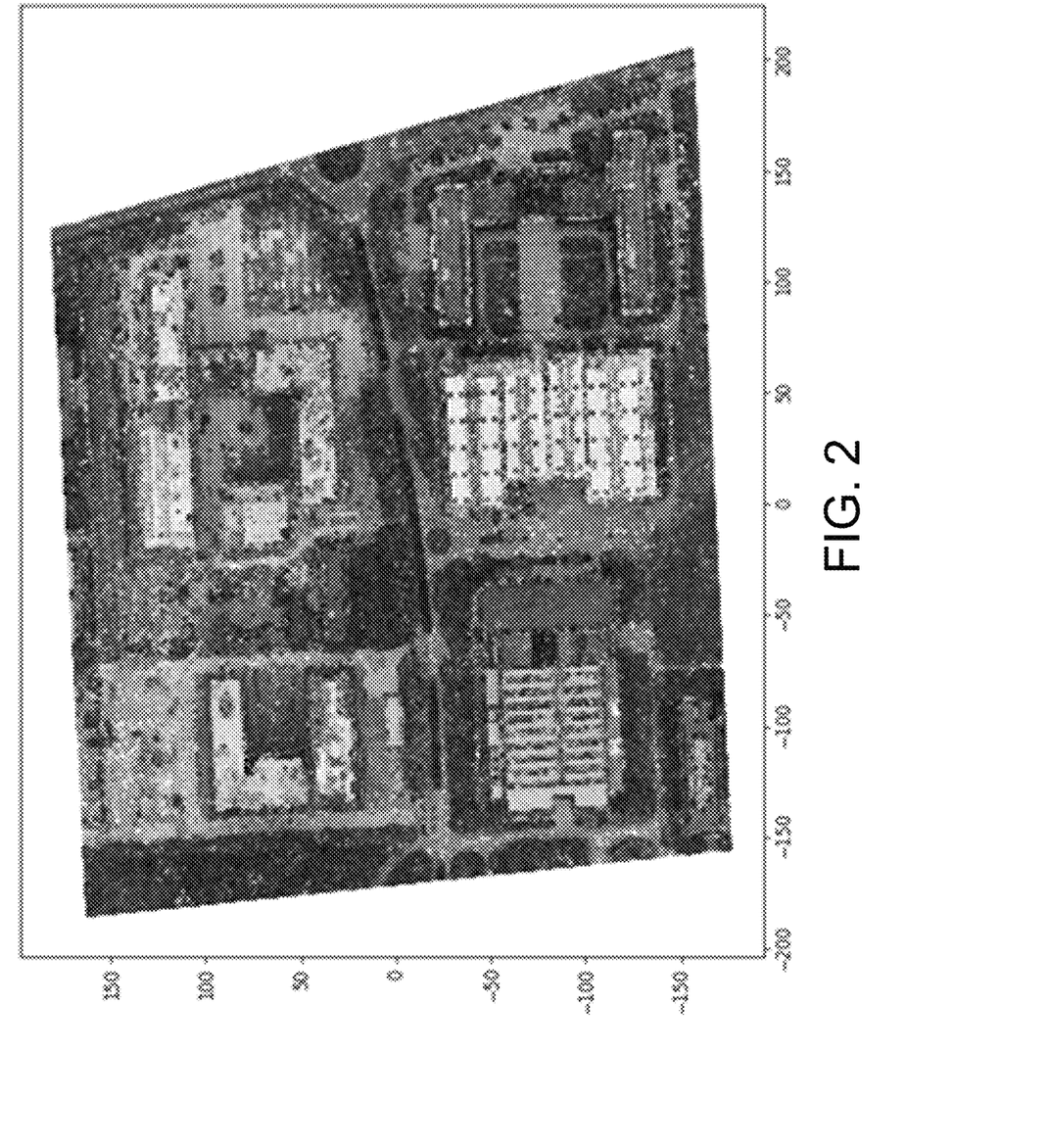
FIG. 2 is a schematic diagram of point cloud segmentation and extraction according to one embodiment.

Wherein, the point cloud segmentation and extraction may be segmentation and extraction of the ground and buildings in the initial point cloud data. A schematic diagram of the point cloud segmentation and extraction is shown in FIG. 2.

Wherein, voxel downsampling and point cloud segmentation and extraction may be performed on the initial point cloud data by means of a Python language and an Open3D data processing library, such that the requirement for multi-platform transplantable dynamic visualization of regional earthquake disasters can be satisfied, the computing efficiency is high, and regional or even city-sized point cloud dynamic visual scenes can be constructed quickly; further, the superiorities of the front-end preprocessing algorithm and rendering of Open3D and the arrangement of a GPU at the back end of Open3D for parallel acceleration greatly improve the computing efficiency, and Open3D supports 3D deep learning, thus facilitating subsequent intelligent upgrading of software.

S280, updating in real time coordinates of each point of the point cloud corresponding to each building at the present time according to the shake displacement data varying with time of the buildings.

Wherein, the coordinates of each point of the point cloud corresponding to each building at the present time may be updated in real time by means of the Python language and the Open3D data processing library according to the shake displacement data varying with time of the buildings, such that the requirement for multi-platform transplantable dynamic visualization of regional earthquake disasters can be satisfied, the computing efficiency is high, and regional or even city-sized point cloud dynamic visual scenes can be constructed quickly.

S300, rendering in real time the ground point cloud and the coordinates of each point of the point cloud corresponding to each building at the present time to generate a dynamic visual image for displaying.

Wherein, by rendering the ground point cloud and the coordinates of each point of the point cloud corresponding to each building at the present time to generate a dynamic visual image for displaying, the requirement for multi-platform transplantable dynamic visualization of regional earthquake disasters can be satisfied, the computing efficiency is high, and regional or even city-sized point cloud dynamic visual scenes can be constructed quickly.

According to the dynamic visualization method for earthquake disasters, initial point cloud data of buildings and scenes in a target area is acquired; shake displacement data varying with time of the buildings is acquired, wherein the shake displacement data is obtained by simulating an earthquake excitation on the buildings and the scenes; then, voxel downsampling and point cloud segmentation and extraction are performed on the initial point cloud data to determine a ground point cloud and a point cloud corresponding to each building; coordinates of each point of the point cloud corresponding to each building at the present time are updated in real time according to the shake displacement data varying with time of the buildings; and the ground point cloud and the coordinates of each point of the point cloud corresponding to each building at the present time are rendered in real time to generate a dynamic visual image for displaying. In this way, by rendering the ground point cloud and the coordinates of each point of the point cloud corresponding to each building at the present time to generate a dynamic visual image for displaying, seismic scenes of regional buildings can be presented more truly and visually, thus improving the visualization effect.

In one possible embodiment, acquiring initial point cloud data of buildings and scenes in a target area comprises: performing data acquisition on the buildings and scenes in the target area by means of an unmanned aerial vehicle, a laser scanner and a depth camera respectively to obtain corresponding data of the unmanned aerial vehicle, the laser scanner and the depth camera; and fusing the corresponding data of the unmanned aerial vehicle, the laser scanner and the depth camera to generate the initial point cloud data of the buildings and scenes in the target area.

Wherein, the buildings and scenes in the target area are photographed by means of the unmanned aerial vehicle to obtain the corresponding data of the unmanned aerial vehicle, wherein the data may be an image.

Wherein, the buildings and scenes in the target area are scanned by means of the laser scanner to obtain the corresponding data of the laser scanner, wherein the data may be point cloud data.

Wherein, the buildings and scenes in the target area are photographed by means of the depth camera to obtain the corresponding data of the depth camera, wherein the data may be a depth image.

Wherein, fusing the corresponding data of the unmanned aerial vehicle, the laser scanner and the depth camera may be transforming the corresponding image of the unmanned aerial vehicle, the corresponding point cloud data of the laser scanner and the corresponding depth image of the depth camera to the same coordinate system and then fusing them into the initial point cloud data of the buildings and scenes in the target area.

In one possible embodiment, performing voxel downsampling and point cloud segmentation and extraction on the initial point cloud data to determine a ground point cloud and a point cloud corresponding to each building comprises: performing voxel downsampling on the initial point cloud data to obtain downsampled point cloud data; extracting points belonging to the ground from the downsampled point cloud data by a plane fitting technique to determine the ground point cloud; and segmenting points, not belonging to the ground, in the downsampled point cloud data by clustering to determine the point cloud corresponding to each building.

In one possible embodiment, updating in real time coordinates of each point of the point cloud corresponding to each building at the present time according to the shake displacement data varying with time of the buildings comprises: performing fitting according to the shake displacement data varying with time of the buildings to generate a fitting function varying with time; binding each point in the fitting function with each point of the point cloud corresponding to each building; and updating in real time the coordinates of each point of the point cloud corresponding to each building according to the fitting function at the present time.

Wherein, the fitting function may be a deformation function obtained by fitting according to displacement response data of each floor of each building at different times (that is, the shake displacement data varying with time of the buildings).

Wherein, the coordinates of each point of the point cloud corresponding to each building are substituted into the fitting function at the present time to obtain the coordinates of each point of the point cloud corresponding to each building at the present time (updated coordinates of each point of the point cloud corresponding to each building).

It should be understood that by substituting the coordinates of each point of the point cloud corresponding to each building into the fitting function at the present time, the coordinates of each point of the point cloud corresponding to each building at the present time can be obtained to make the visualization effect truer, thus further improving the visualization effect.

In one possible embodiment, updating in real time the coordinates of each point of the point cloud corresponding to each building according to the fitting function at the present time comprises: updating the coordinates of each point of the point cloud corresponding to each building according to the fitting function at the present time and a preset shake coefficient.

Wherein, the preset shake coefficient may be used for adjusting the shake presentation coefficient of each building and increasing or decreasing the shake amplitude of each building to improve the visualization effect. For example, in a case where the shake amplitude of each building is small and cannot be observed visually, the preset shake coefficient can be increased to increase the shake amplitude of each building, such that the shaking condition of each building can be visually seen.

In one possible embodiment, the coordinates of each point of the point cloud corresponding to each building may be updated according to the fitting function at the present time to obtain coordinates of each point of the point cloud corresponding to each building at the present time; and based on the coordinates of each point of the point cloud corresponding to each building at the present time, the coordinates of each point of the point cloud corresponding to each building at the present time are adjusted. Assume the coordinates of a point A at the present time are (0.1, 0, 3) and the preset shake coefficient is 100, the value of the x-coordinate of the point A is multiplied by the preset shake coefficient, that is, 0.1*100=10, to obtain updated coordinates (10, 0, 3) of the point A, and the updated coordinates (10, 0, 3) of the point A are rendered.

In one possible embodiment, rendering in real time the ground point cloud and the coordinates of each point of the point cloud corresponding to each building at the present time to generate a dynamic visual image for displaying comprise: rendering in real time the ground point cloud and the coordinates of each point of the point cloud corresponding to each building at the present time according to preset rendering parameters to generate a dynamic building visual image for displaying; and/or, coloring each point of the point cloud corresponding to each building at the present time according to a displacement change of each point of the point cloud corresponding to each building at the present time to generate a colored point cloud corresponding to each building at the present time; and rendering the ground point cloud and the colored point cloud corresponding to each building at the present time according to the preset rendering parameters to generate a dynamic building point cloud visual image for displaying.

Wherein, the preset rendering parameters may comprise: the point cloud size, the background color, the position and size of a visible window, and the like.

Wherein coloring each point of the point cloud corresponding to each building at the present time according to a displacement change of each point of the point cloud corresponding to each building at the present time may comprise: setting a point cloud with the maximum displacement and a point cloud with the minimum point cloud to be in two complementary colors and performing interpolated color matching on other point clouds according to their displacements. By coloring the point clouds, floors with large displacements of each building can be visually seen, thus improving the visualization effect.

Figure 3:
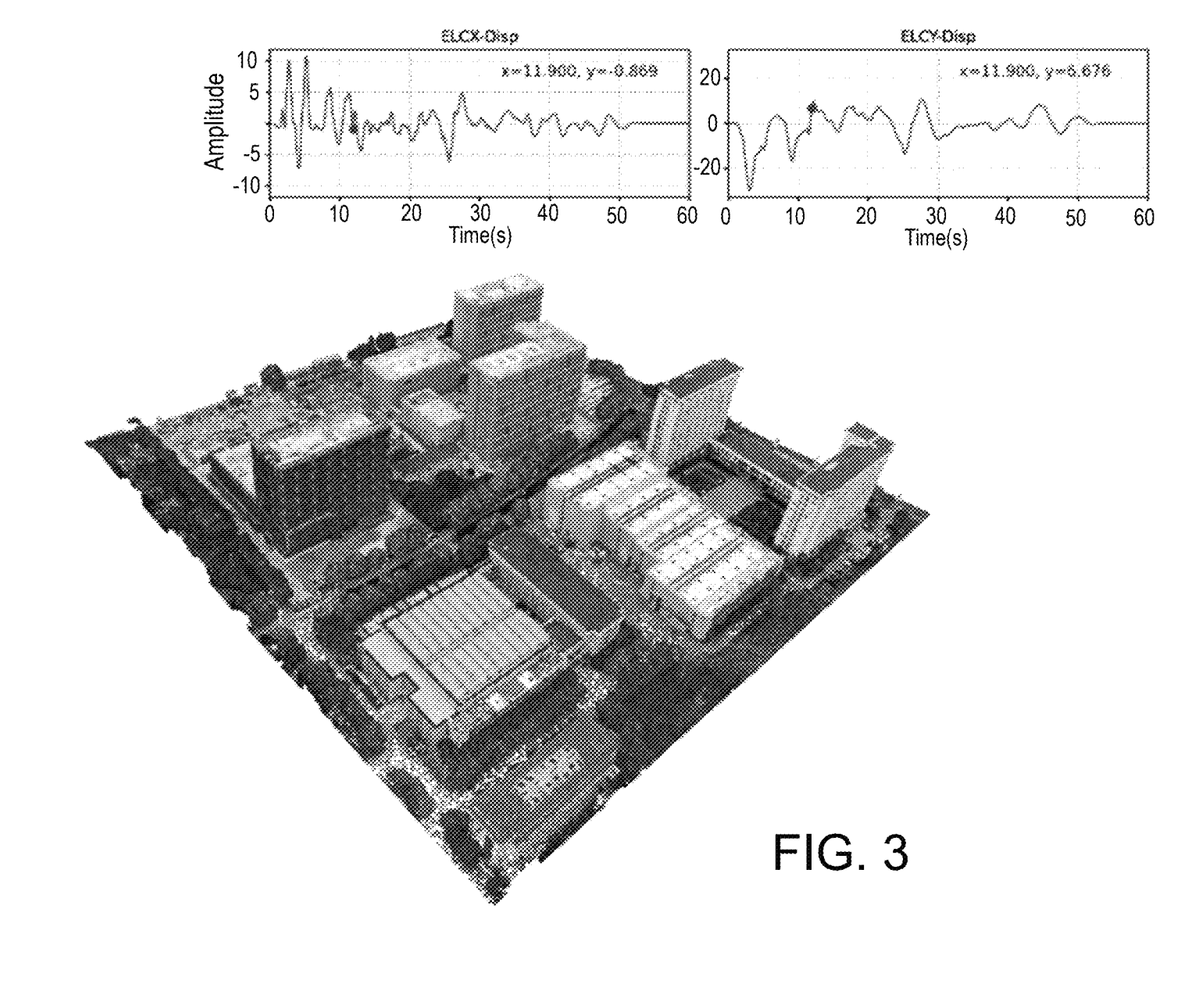
FIG. 3 is a schematic diagram of a building visual image at a certain time according to one embodiment of the invention.

Wherein, the dynamic building visual image may dynamically display the displacement of each building in the target area under the earthquake excitation in the form of an image, such as the schematic diagram of the visible building image at a certain time is shown in FIG. 3.

Figure 4:
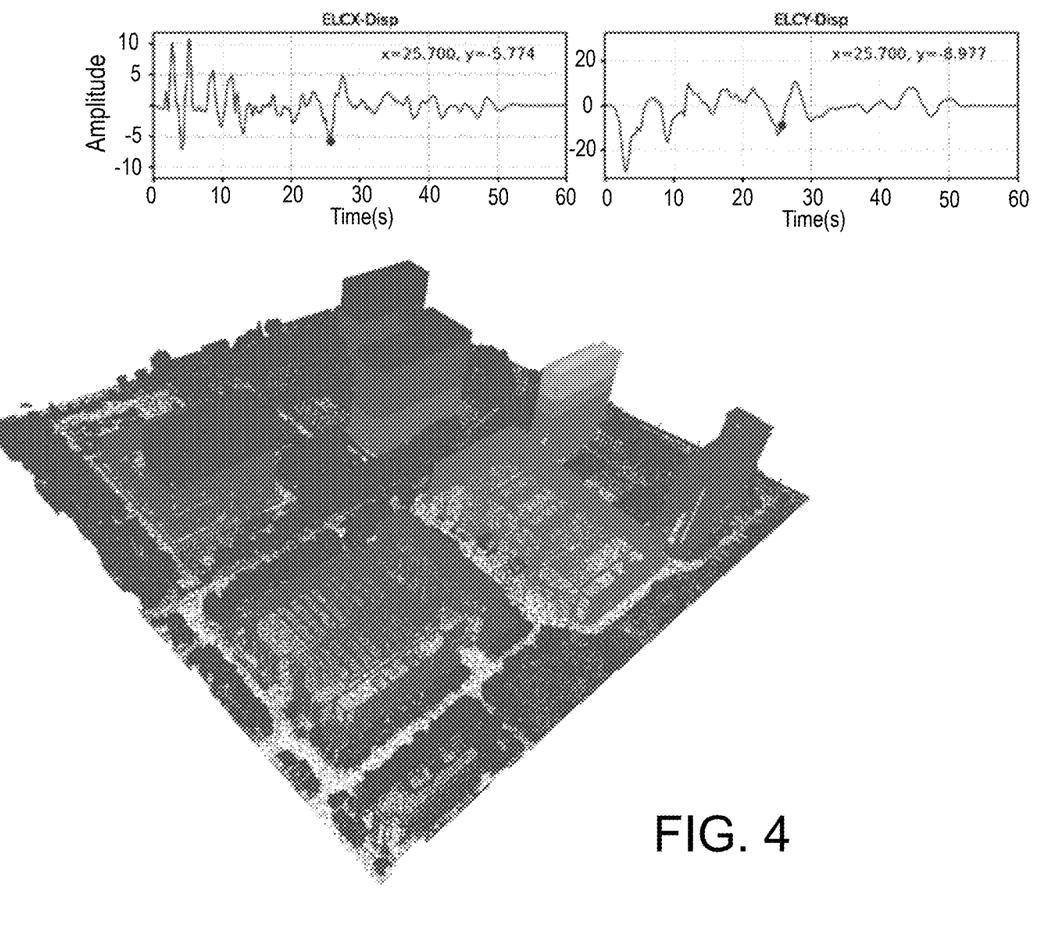
FIG. 4 is a schematic diagram of a building point cloud visual image at a certain time according to one embodiment of the invention.

Wherein, the dynamic building point cloud visual image may be an image formed by colored point clouds, which dynamically presents the displacement of each building in the target area under the earthquake excitation. For example, floors with large displacements can be visually seen according to the color, such as the schematic diagram of the building point cloud visual image at a certain time shown in FIG. 4.

According to the dynamic visualization device for earthquake disasters, by adopting open3D, the requirements for cross-platform point cloud data processing and dynamic visualization are satisfied; interpolation is performed according to a deformation function obtained by fitting displacement responses of floors at different times, and an accurate displacement of each point can be obtained by substituting the coordinates of point clouds into the deformation function, thus obtaining a truer visualization effect; the point cloud data adopted occupy a small space, thus reducing the data storage space; segmentation and extraction can be performed directly according to point cloud coordinates, so the computation time is shortened, and the operating rate can be optimized and adjusted according to precision requirements; the superiorities of the front-end preprocessing algorithm and rendering of Open3D and the arrangement of a GPU at the back end of Open3D for parallel acceleration greatly improve the computing efficiency; data in the point cloud format can be obtained extensively such as through an unmanned aerial vehicle, a laser scanner and a depth camera; and Open3D supports 3D deep learning, facilitating subsequent intelligent upgrading of software.

It should be understood that although the steps in the flow diagram in FIG. 1 are sequentially displayed as indicated by the arrows, these steps are not necessarily executed in the sequence as indicated by the arrows. Unless otherwise clearly stated in this specification, there is no strict limitation on the execution sequence of these steps, and these steps may be performed in other sequences. In addition, at least part of the steps in FIG. 1 may comprise multiple sub-steps or sub-stages, which are not necessarily executed at the same time and may be executed at different times, and these sub-steps or sub-stages are not necessarily executed in sequence and may be executed in turn or alternately with other steps or at least part of the sub-steps or sub-stages of other steps.

Figure 5:
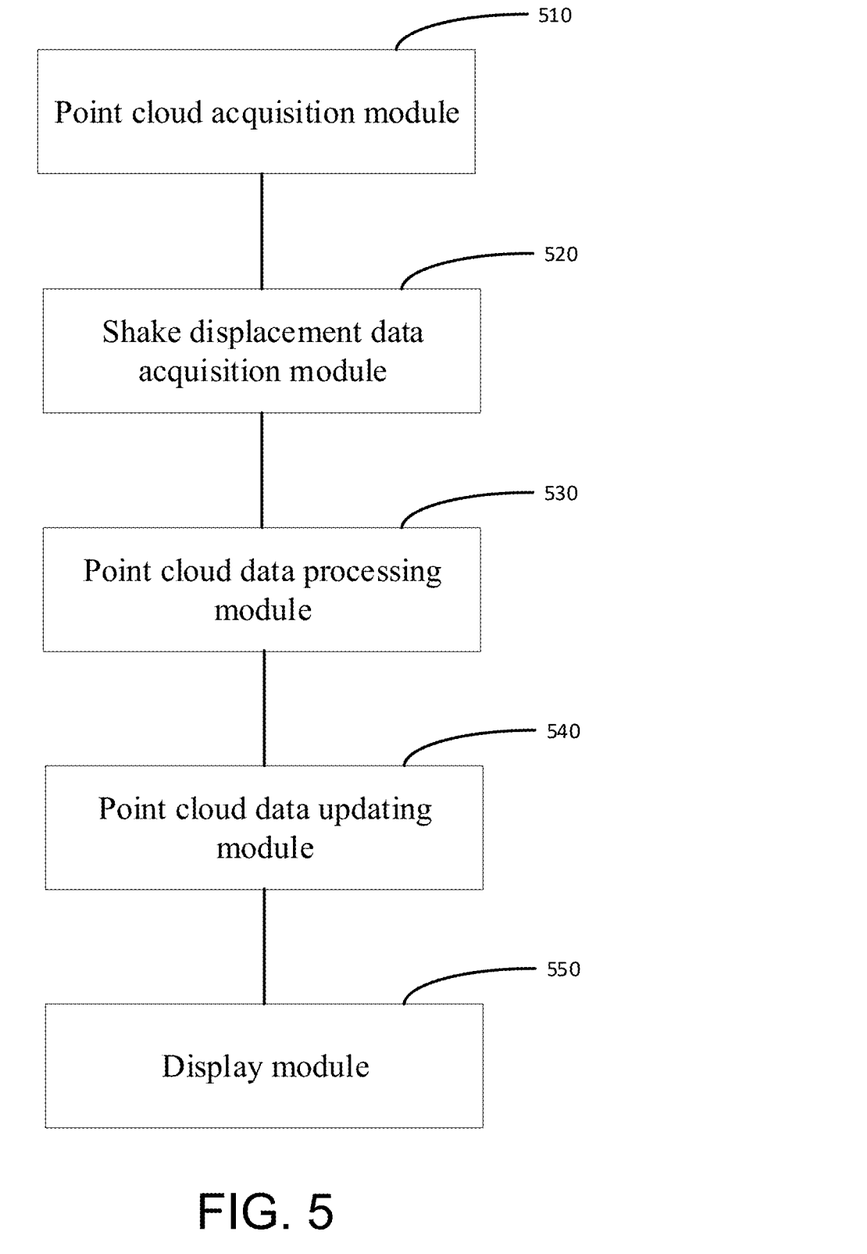
FIG. 5 is a schematic structural diagram of a dynamic visualization device for earthquake disasters according to one embodiment.

In one embodiment, as shown in FIG. 5, a dynamic visualization device for earthquake disasters is provided. The earthquake dynamic visualization device may adopt software modules, hardware modules, or the combination of software modules and hardware modules, as one part of a computer device. The dynamic visualization device for earthquake disasters specifically comprises:

a point cloud data acquisition module 510 configured to acquire initial point cloud data of buildings and scenes in a target area;

a shake displacement data acquisition module 520 configured to acquire shake displacement data varying with time of the buildings, wherein the shake displacement data is obtained by simulating an earthquake excitation on the buildings and the scenes;

a point cloud data processing module 530 configured to perform voxel downsampling and point cloud segmentation and extraction on the initial point cloud data to determine a ground point cloud and a point cloud corresponding to each building;

a point cloud data updating module 540 configured to update in real time coordinates of each point of the point cloud corresponding to each building at the present time according to the shake displacement data varying with time of the buildings; and a display module 550 configured to render in real time the ground point cloud and the coordinates of each point of the point cloud corresponding to each building at the present time to generate a dynamic visual image for displaying.

Specific limitations of the dynamic visualization device for earthquake disasters can be appreciated with reference to limitations of the dynamic visualization method for earthquake disasters mentioned above and will not be repeated here. All or part of the modules in the dynamic visualization device for earthquake disasters can be implemented by software, hardware and the combination thereof. The above modules may be inlaid in or independent of a processor of a computer device in the form of hardware, and may also be stored in a memory of the computer device in the form of software to be called by the processor to perform corresponding operations.

Those skilled in the art can clearly understand that for facilitating and simplifying the description, the above functional units and modules are described merely by way of examples. In actual application, the above functions may be fulfilled by different functional units or modules as required, that is, the internal structure of the device may be divided into different functional units or modules to complete all or part of the functions described above. The functional units or modules in the embodiments may be integrated in one processing unit or physically separated from each other, or two or more units are integrated in one unit. The integrated units may be implemented in the form of hardware or in the form of software functional units. In addition, the specific names of the functional units or modules are merely for a distinguishing purpose and are not used for limiting the protection scope of the application. The specific operating process of the units or modules in the system can be understood with reference to corresponding processes in the embodiment of the method described above and will not be detailed here.

The descriptions of the above embodiments stress on different aspects, and those that are not detailed or recorded in one embodiment can be appreciated in related descriptions of other embodiments.

Those ordinarily skilled in the art can appreciate that all illustrative units and arithmetic steps described in conjunction with the embodiments disclosed in this specification can be implemented by means of electronic hardware or both computer software and electronic hardware. Whether these functions are implemented by hardware or software depends on specific applications and design constraints of the technical solutions. For each specific application, professionals can fulfill the functions described above through different methods, which should not be construed as exceeding the scope of the application.

It should be understood that the device/terminal equipment and method disclosed in the embodiments of the application may be implemented in other ways. For example, the embodiment of the device/terminal equipment described above is merely illustrative. For example, the modules or units are configured merely based on logic functions, and in actual implementation, the modules or units may be configured in other ways. For example, multiple units or modules may be combined or integrated into another system, or some features may be omitted or not implemented. In addition, coupling, direct coupling or communication displayed or discussed may be indirect coupling or communication realized by means of some interfaces, devices or units, or electrical or mechanical coupling or communication, or coupling or communication in other forms.

Units which are described as separate components may be or not be physically separated, and units which are used as display components may be or not be physical units, that is, they may be located in the same place or distributed on multiple network units. All or part of the units may be selected as actually needed to fulfill the purposes of the embodiments of the application.

In addition, all functional units in the embodiments of the application may be integrated in one processing unit, or the functional units exist separately, or two or more units may be integrated in one unit. The integrated units may be implemented in the form of hardware or in the form of hardware functional units.

When the integrated modules/units are implemented in the form of software functional units and sold or used as independent products, these integrated modules/units may be stored in a computer-readable storage medium. Based on such an understanding, all or part of the processes for implementing the method in the above embodiment may be completed by means of hardware instructed by a computer program, which may be stored in a computer-readable storage medium. When the computer program is executed by a processor, the steps in the embodiment of the method can be implemented. Wherein, the computer program comprises computer program codes, which may be source codes, object codes, executable files or some intermediate codes. The computer-readable storage medium may comprise: any entity or device capable of carrying the computer program codes, a recording medium, a USB flash disk, a diskette, an optical disk, a computer memory, a read-only memory (ROM), a random access memory (RAM), an electric carrier signal, a telecommunication signal, a software distribution medium or the like. It should be noted that the contents comprised by the computer readable storage medium can be appropriately added or deleted as required by legislation and patent practice in judicial districts. For example, in some judicial districts, the computer-readable storage medium does not comprise the electric carrier signal and the telecommunication signal as required by legislation and patent practice.

All or part of the processes for implementing the method in the above embodiment of the invention may be implemented through a computer program product, and when the computer program product runs on terminal equipment, the terminal equipment implements the steps in the embodiment of the method.

All technical features in the above embodiments can be freely combined. For the sake of a brief description, not all possible combinations of the technical features of the above embodiments are described. However, all combinations of the technical features obtained without conflicts should be construed as falling within the scope recorded in this specification.

The above embodiments merely illustrate several implementations of the application and are specifically described in detail, but they should not be construed as limitations of the patent scope of the invention. It should be pointed out that those ordinarily skilled in the art can make some transformations and improvements without departing from the concept of the application, and all these transformations and improvements also belong to the protection scope of the application. Therefore, the protection scope of the application should be defined by the appended claims.

What is claimed is:

1. A dynamic visualization method for earthquake disasters, comprising
    acquiring initial point cloud data of a plurality of buildings and a plurality of scenes in a target area;
    acquiring shake displacement data varying with time of the buildings, wherein the shake displacement data is obtained by simulating an earthquake excitation on the buildings and the scenes;
    performing voxel downsampling and point cloud segmentation and extraction on the initial point cloud data to determine a ground point cloud and a point cloud corresponding to each of the buildings;
    updating in real time coordinates of each point of the point cloud corresponding to each of the buildings at the present time according to the shake displacement data varying with time of the buildings; and
    rendering in real time the ground point cloud and the coordinates of each point of the point cloud corresponding to each of the buildings at the present time to generate a dynamic visual image for displaying.

2. The dynamic visualization method for earthquake disasters according to claim 1, wherein acquiring initial point cloud data of buildings and scenes in a target area comprises:
    performing data acquisition on the buildings and the scenes in the target area by means of an unmanned aerial vehicle, a laser scanner and a depth camera respectively to obtain corresponding data of the unmanned aerial vehicle, the laser scanner and the depth camera; and fusing the corresponding data of the unmanned aerial vehicle, the laser scanner and the depth camera to generate the initial point cloud data of the buildings and the scenes in the target area.

3. The dynamic visualization method for earthquake disasters according to claims 2, wherein rendering in real time the ground point cloud and the coordinates of each point of the point cloud corresponding to each building at the present time to generate a dynamic visual image for displaying comprise:

rendering in real time the ground point cloud and the coordinates of each point of the point cloud corresponding to each building at the present time according to preset rendering parameters to generate a dynamic building visual image for displaying;

and/or, coloring each point of the point cloud corresponding to each of the buildings at the present time according to a displacement change of each point of the point cloud corresponding to each of the buildings at the present time to generate a colored point cloud corresponding to each of the buildings at the present time; and rendering the ground point cloud and the colored point cloud corresponding to each of the buildings at the present time according to the preset rendering parameters to generate a dynamic building point cloud visual image for displaying.

4. The dynamic visualization method for earthquake disasters according to claim 1, wherein performing voxel downsampling and point cloud segmentation and extraction on the initial point cloud data to determine a ground point cloud and a point cloud corresponding to each building comprises:

performing voxel downsampling on the initial point cloud data to obtain downsampled point cloud data;

extracting points belonging to the ground from the downsampled point cloud data by a plane fitting technique to determine the ground point cloud; and segmenting points, not belonging to the ground, in the downsampled point cloud data by clustering to determine the point cloud corresponding to each of the buildings.

5. The dynamic visualization method for earthquake disasters according to claims 4, wherein rendering in real time the ground point cloud and the coordinates of each point of the point cloud corresponding to each building at the present time to generate a dynamic visual image for displaying comprise:

rendering in real time the ground point cloud and the coordinates of each point of the point cloud corresponding to each building at the present time according to preset rendering parameters to generate a dynamic building visual image for displaying;

and/or, coloring each point of the point cloud corresponding to each of the buildings at the present time according to a displacement change of each point of the point cloud corresponding to each of the buildings at the present time to generate a colored point cloud corresponding to each of the buildings at the present time; and rendering the ground point cloud and the colored point cloud corresponding to each of the buildings at the present time according to the preset rendering parameters to generate a dynamic building point cloud visual image for displaying.

6. The dynamic visualization method for earthquake disasters according to claim 1, wherein updating in real time coordinates of each point of the point cloud corresponding to each building at the present time according to the shake displacement data varying with time of the buildings comprises:

performing fitting according to the shake displacement data varying with time of the buildings to generate a fitting function varying with time;

binding each point in the fitting function with each point of the point cloud corresponding to each of the buildings; and updating in real time the coordinates of each point of the point cloud corresponding to each of the buildings according to the fitting function at the present time.

7. The dynamic visualization method for earthquake disasters according to claims 6, wherein rendering in real time the ground point cloud and the coordinates of each point of the point cloud corresponding to each building at the present time to generate a dynamic visual image for displaying comprise:

rendering in real time the ground point cloud and the coordinates of each point of the point cloud corresponding to each building at the present time according to preset rendering parameters to generate a dynamic building visual image for displaying;

and/or, coloring each point of the point cloud corresponding to each of the buildings at the present time according to a displacement change of each point of the point cloud corresponding to each of the buildings at the present time to generate a colored point cloud corresponding to each of the buildings at the present time; and rendering the ground point cloud and the colored point cloud corresponding to each of the buildings at the present time according to the preset rendering parameters to generate a dynamic building point cloud visual image for displaying.

8. The dynamic visualization method for earthquake disasters according to claim 1, wherein updating in real time the coordinates of each point of the point cloud corresponding to each building according to the fitting function at the present time comprises:

updating the coordinates of each point of the point cloud corresponding to each of the buildings according to the fitting function at the present time and a preset shake coefficient.

9. The dynamic visualization method for earthquake disasters according to claims 8, wherein rendering in real time the ground point cloud and the coordinates of each point of the point cloud corresponding to each building at the present time to generate a dynamic visual image for displaying comprise:

rendering in real time the ground point cloud and the coordinates of each point of the point cloud corresponding to each building at the present time according to preset rendering parameters to generate a dynamic building visual image for displaying;

and/or, coloring each point of the point cloud corresponding to each of the buildings at the present time according to a displacement change of each point of the point cloud corresponding to each of the buildings at the present time to generate a colored point cloud corresponding to each of the buildings at the present time; and rendering the ground point cloud and the colored point cloud corresponding to each of the buildings at the present time according to the preset rendering parameters to generate a dynamic building point cloud visual image for displaying.

10. The dynamic visualization method for earthquake disasters according to claim 1, wherein rendering in real time the ground point cloud and the coordinates of each point of the point cloud corresponding to each building at the present time to generate a dynamic visual image for displaying comprise:

rendering in real time the ground point cloud and the coordinates of each point of the point cloud corresponding to each building at the present time according to preset rendering parameters to generate a dynamic building visual image for displaying;

and/or, coloring each point of the point cloud corresponding to each of the buildings at the present time according to a displacement change of each point of the point cloud corresponding to each of the buildings at the present time to generate a colored point cloud corresponding to each of the buildings at the present time; and rendering the ground point cloud and the colored point cloud corresponding to each of the buildings at the present time according to the preset rendering parameters to generate a dynamic building point cloud visual image for displaying.

11. A dynamic visualization device for earthquake disasters, comprising
a point cloud data acquisition circuit configured to acquire initial point cloud data of a plurality of buildings and a plurality of scenes in a target area;
a shake displacement data acquisition circuit configured to acquire shake displacement data varying with time of the buildings, wherein the shake displacement data is obtained by simulating an earthquake excitation on the buildings and the scenes;
a point cloud data processing circuit configured to perform voxel downsampling and point cloud segmentation and extraction on the initial point cloud data to determine a ground point cloud and a point cloud corresponding to each of the buildings;
a point cloud data updating circuit configured to update in real time coordinates of each point of the point cloud corresponding to each of the buildings at the present time according to the shake displacement data varying with time of the buildings; and
a display circuit configured to render in real time the ground point cloud and the coordinates of each point of the point cloud corresponding to each of the buildings at the present time to generate a dynamic visual image for displaying.

* * * * *